United States Patent [19]

Baurmeister

[11] Patent Number: 5,297,591
[45] Date of Patent: Mar. 29, 1994

[54] HOLLOW FIBER BUNDLE

[75] Inventor: Ulrich Baurmeister, Wuppertal, Fed. Rep. of Germany

[73] Assignee: Akzo N.V., Arnhem, Netherlands

[21] Appl. No.: 40,203

[22] Filed: Mar. 31, 1993

Related U.S. Application Data

[62] Division of Ser. No. 880,712, May 8, 1992, Pat. No. 5,224,522, which is a division of Ser. No. 654,596, Feb. 13, 1991, Pat. No. 5,141,031.

[30] Foreign Application Priority Data

Feb. 16, 1990 [DE] Fed. Rep. of Germany ....... 4004797

[51] Int. Cl.$^5$ ............................................. D03D 15/00
[52] U.S. Cl. ................... 139/383 R; 139/431;
139/420 A; 210/321.79; 428/36.3
[58] Field of Search ............. 210/321.79, 321.8, 321.88,
210/321.89; 428/364, 36.3, 36.1; 139/426 R,
383 A, 420 A, 420 R, 383 R, 431

[56] References Cited

U.S. PATENT DOCUMENTS

| | | |
|---|---|---|
| 3,099,907 | 8/1963 | Masurel et al. . |
| 3,605,225 | 9/1971 | Gibson et al. . |
| 3,996,971 | 12/1976 | Griffith et al. . |
| 4,006,758 | 2/1977 | Libby . |
| 4,046,172 | 9/1977 | Russell . |
| 4,140,637 | 2/1979 | Walter . |
| 4,160,467 | 7/1979 | Woodruff . |
| 4,202,381 | 5/1980 | Bucher . |
| 4,276,249 | 6/1981 | Holladay . |
| 4,331,181 | 5/1982 | Murasaki . |
| 4,399,841 | 8/1981 | Muller . |
| 4,430,219 | 2/1984 | Kuzumoto et al. ............ 210/321.88 |
| 4,559,884 | 12/1985 | Stoldt et al. . |
| 4,569,883 | 2/1986 | Renjilian . |
| 4,681,720 | 7/1987 | Baumgart et al. . |
| 4,761,864 | 8/1988 | Berger et al. . |
| 4,940,617 | 7/1990 | Baurmeister . |
| 5,143,312 | 9/1992 | Baurmeister . |

FOREIGN PATENT DOCUMENTS

| | | |
|---|---|---|
| 0089122 | 2/1983 | European Pat. Off. . |
| 0285812 | 3/1988 | European Pat. Off. . |
| 2726181 | 12/1977 | Fed. Rep. of Germany . |
| 2637618 | 1/1978 | Fed. Rep. of Germany . |
| 2825065 | 12/1979 | Fed. Rep. of Germany . |
| 3106684A1 | 12/1981 | Fed. Rep. of Germany . |
| 3108944A1 | 4/1982 | Fed. Rep. of Germany . |
| 233946A1 | 3/1986 | Fed. Rep. of Germany . |

Primary Examiner—Andrew M. Falik

[57] ABSTRACT

A hollow fiber bundle in which the hollow fibers are in the form of warp threads of woven hollow fiber tapes. The plurality of hollow fibers are held together by a low density, double weft thread. The hollow fiber bundles may form an angle with the lengthwise axis of the bundle such that adjacent woven hollow fiber tapes form an angle of intersection with one another or alternatively, the hollow fiber tapes may be made into partial bundles and the partial bundles assembled together so that the hollow fibers are arranged essentially parallel to one another and the lengthwise axis of the bundle. In both cases, the presence of weft threads ensures that the hollow fibers will not slide into the spaces between adjacent hollow fibers.

2 Claims, 8 Drawing Sheets

HOLLOW FIBER BUNDLE

This is a division of application Ser. No. 07/880,712, U.S. Pat. No. 5,224,522 filed May 8, 1992 which is a division of application Ser. No. 07/654,596 filed Feb. 13, 1991 and issued as U.S. Pat. No. 5,141,031 on Aug. 25, 1992.

BACKGROUND OF THE INVENTION

The invention relates to a woven hollow fiber tape with weft threads and hollow threads as the warp threads. The invention also relates to a method and a device for manufacturing the woven hollow fiber tape as well as hollow fiber bundles composed of woven hollow fiber tapes.

A woven hollow fiber tape with weft threads and hollow threads as the warp threads and a blood oxygenator manufactured therefrom are known from EP-A2-0 089 122. This known woven hollow fiber tape is the type manufactured on a so-called shuttle loom. The manufacture of such woven hollow fiber tapes is very cumbersome and hence expensive. A further disadvantage of hollow fiber tapes woven in this manner is that the weft threads cannot be pulled out again as is frequently desired. In addition, this hollow fiber tape necessarily has a monofilament (solid fiber) on each side edge to protect the hollow fibers at the edge against transverse forces and abrasion by the shuttle and to absorb tensile stresses. Such threads, however, make the manufacture of the hollow fiber tape more difficult and frequently cause problems in the finished device. Processing this known woven hollow fiber tape into a blood oxygenator and the blood oxygenator itself likewise involve disadvantages. One disadvantage of this known processing method to turn a woven hollow fiber tape into a blood oxygenator is its considerable engineering cost. Thus, a special device is required for reversal when the woven hollow fiber tape is reversed at the ends of the winder to form the next hollow fiber layer, said device making the reversal possible. In addition, the area of deflection of the hollow fibers which thus results and cannot be used is considerable, resulting in a large percentage of waste. This method also has the additional disadvantage that the winding angle to the axis of the winder is only between 30° and 90°. The length of the hollow fibers is then a multiple of the axial length of the winder. This results in an increased pressure loss in the interior (lumen) of the hollow fibers. In addition, if the winding angle between the axis of the winder and the woven hollow fiber tape is not modified accordingly as a function of the number of layers, the length of the hollow fibers will increase with an increasing number of layers. This produces a non-uniform flow through the hollow fibers, something which is generally undesirable.

SUMMARY OF THE INVENTION

Hence, the goal of the present invention is to provide a woven hollow fiber tape which is less expensive to manufacture and can be employed much more diversely, the tape also permitting a design in which the weft threads perform only a temporary auxiliary function when processing a plurality of hollow fibers (hollow fiber sheet), in other words, a processing aid. Another goal is to provide a simpler and more economical method of manufacture to make a woven hollow fiber tape of this kind as well as a device suitable for the purpose. Finally, another goal consists of providing hollow fiber bundles which can be produced economically from woven hollow fiber tapes with a high material and/or heat exchange ability.

These goals are achieved by a woven hollow fiber tape with weft threads and hollow threads as warp threads, designed according to the invention as a double weft tape, by the method described below, by the device described below, and by the hollow fiber bundles described below.

Hollow fibers whose walls are completely or partially permeable to materials, in other words, are permeable or semi-permeable, and which consequently are suitable for material exchange, material separation, and/or material transfer, are frequently also referred to as capillary membranes. Capillary membranes can be used in medical or technical applications. Typical applications for capillary membranes include, for example, blood plasmapheresis, hemofiltration, electrodialysis, dialysis, oxygenation, reverse osmosis, ultrafiltration, microfiltration, pervaporation, etc.

The outside diameters of hollow fibers (capillary membranes) lie in the following ranges, for example:

for dialysis, from 150 $\mu$m to 280 $\mu$m;
for oxygenation, from 150 $\mu$m to 500 $\mu$m;
for plasmapheresis, from 150 $\mu$m to 650 $\mu$m.

Hollow fibers with a wall that is essentially impermeable to materials are frequently used for heat transfer, in other words, in heat exchangers. Hollow fibers with a (micro-)porous wall are used, for example, for (micro-)filtration, membrane distillation, etc.

To make material and heat exchangers of this type, a plurality of hollow fibers is normally combined to form a hollow fiber bundle and thereby, preferably placed in a certain arrangement, to shape the flow area between the hollow fibers for the medium flowing around the outsides of the hollow fibers in such a way that, depending on the application of such a hollow fiber bundle, specific requirements regarding momentum, heat, and material transport phenomena are met.

For example, in a capillary membrane oxygenator the blood flows between the capillary membranes, that is, the latter have the blood flowing around them externally. Capillary membranes are terminated by embedding them in such a way that their openings terminate in separate supply and discharge chambers for the oxygen flowing through the capillary membranes, their lumina. For gas exchange between the blood and the oxygen through the walls of the capillary membranes it is therefore advantageous to arrange the capillary membranes in such a way that a high oxygen/carbon dioxide exchange is achieved and only a small blood/membrane contact area is required.

These and other requirements are met by the invention in an economical and technically superior fashion. For an improved understanding of the terminology employed here and the technology of the preferred manufacturing method and the device suitable for the purpose, the reader is referred to the following patents, which also serve for disclosure of the invention: U.S. Pat. Nos. 4,399,841, 4,761,864, 3,605,225, 4,006,758.

BRIEF DESCRIPTION OF THE DRAWINGS

The invention will now be described in greater detail with reference to the drawings, wherein.

DETAILED DESCRIPTION OF PREFERRED EMBODIMENT

Figure 1:
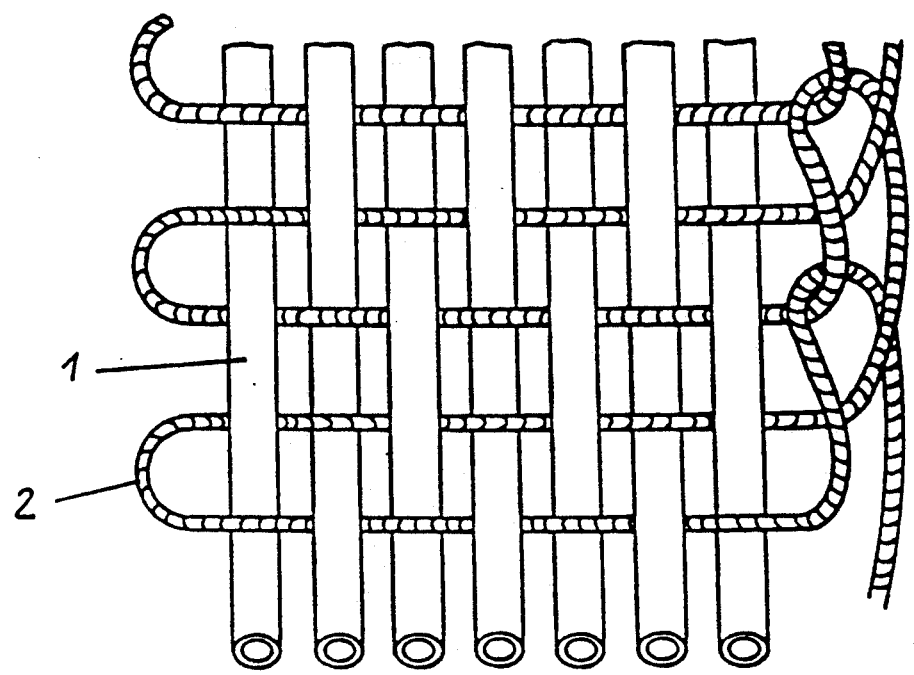
FIG. 1 shows a section of a first embodiment of a woven hollow fiber tape.

The term "double weft tape" will be understood in which a double weft insertion has taken place, in other words, two weft threads are inserted per weft insertion, producing so-called double wefts. Double weft insertion in textile fabrics is a type of rib weave and, with the usual high weft density, results in double-weft rib (grain); for this reason it is also referred to as grain weave. In the manufacture of woven tapes on shuttle looms, a so-called true selvage is produced on both sides of the tape. Shuttleless weaving methods, on the other hand, make it possible to manufacture woven tapes in which at least one edge of the tape is not made in the form of a true selvage. One embodiment of a non-true selvage is the knitted edge, which is also selected as an especially preferred embodiment of the woven hollow fiber tape according to the invention. The knitted edge is produced, for example, in the shuttleless weaving method in which the weft thread is laid as a thread loop through the shed (inserted) and the laterally projecting weft thread loop is knitted into a stitch (crocheted or stitched), in other words, the weft thread is tied to itself. This process is also referred to as the formation of a knitted edge by stitching the weft thread. Such a knitted edge, if desired, can be tightened further (rippled), so that the weft thread can easily be pulled out again completely and removed. However, it is also possible with this technique to tie off the weft thread loops, for example using an auxiliary thread, or to fasten them, for example by gluing, so that rippling is not possible. Tying off or stitching is usually performed using a knitting needle.

The term "weft density" is the number of weft threads per unit length of a woven tape. In the hollow fiber tape woven according to the invention, it is preferably much less than in normal woven textile tapes, whereby firstly, a loose, woven hollow fiber tape with sufficiently dimensioned intermediate spaces for a low-pressure loss flow around the hollow fibers is produced, in which the hollow fibers, however, are arranged at definite mutual intervals, in other words, in the arrangement described above for high material and/or heat transfer ability. The low weft density also provides in advantageous fashion a high manufacturing speed for the woven hollow fiber tape. The term "low weft density" refers, for example, to one that has 3 to 35 mm and especially 10 to 15 mm per weft, but in any case one in which the adjacent weft threads do not lie close together or do not touch one another. The weft threads, therefore, run meanderwise or form a zigzag line, a sawtooth line, or the like, and form an angle with the warp threads which is smaller on the average than 90°, for example, 15° or 30° or 45°.

In the woven hollow fiber tape according to the invention, the weft threads are preferably made of monofil or multifil endless thread which is unwound during manufacture, for example, continuously from a bobbin. The weft threads can be much finer than the hollow fibers. The weft threads can also be made of threads twisted in different ways. In special applications, it may be advantageous for the weft threads to be made of the same material as the warp threads (hollow fibers).

It is also possible to use as weft threads those which themselves possess a property that performs material exchange, which therefore are able, for example, to absorb or adsorb a substance from the medium flowing around the hollow fibers, or to give a substance off to it, possibly with a delay or slowly. The weft threads can also be arranged or made such that they contribute to the formation of turbulence or laminar mixing. The weft threads can also be inserted in such a way that they produce an undulation of the hollow fibers (warp threads), which can result in an increase in the ability to transfer materials and/or heat.

The woven hollow fiber tape can contain, for example, 3 to 300 hollow fibers as the warp threads, with one preferred embodiment containing 15 to 40 hollow fibers. The width of the woven hollow fiber tape essentially reflects the diameter of the hollow fibers. A width of 10 mm, mentioned here only as an example, has proven to be highly suitable in the subsequent processing of the woven hollow fiber tape onto bobbins and into hollow fiber bundles.

The woven hollow fiber tape can also have hollow fibers with different properties for the warp threads. Typical properties of hollow fibers used for different purposes include, for example, wettability (hydrophilia, hydrophobia), permeability, UF rate, etc. The woven hollow fiber tape can also have hydrophobic and hydrophylic hollow fibers in it, or hollow fibers with different permeabilities, each of which serves a different purpose. It can also include hollow fibers that promote material exchange and those which serve for simultaneous heat transfer. Such different hollow fibers can be present in any mixing ratios that correspond to the specific requirements.

In addition, the woven hollow fiber tape can also have a number of threads as warp threads which, for example, have a supporting function or increase the tensile strength of the hollow fiber tape and accept possibly high tensile stresses during subsequent processing of the woven tape. Such threads can also have adsorptive or desorptive properties and remove materials from the medium surrounding them and the hollow fibers, or give off materials to this medium, possibly in a controlled manner.

Threads with precisely adjustable and triggerable shrinking properties can be used, for example, to crimp the hollow fibers in a desired fashion at a given point in time, for example during a certain processing step.

The high order of the woven hollow fiber tape, therefore, makes it possible, for example, to make a woven hollow fiber tape for an IV filter with venting, in which one or more hydrophobic porous hollow fibers for venting are arranged along at least one edge. The hollow fibers can then be embedded in such a way that, because of the high order within the woven hollow fiber tape, the hydrophobic edge fibers which bring about the venting are separated from the hydrophylic hollow fibers which promote filtration, in the embedding area by a suitable distributor head.

The warp and/or weft threads can also perform a function as catalyst, enzyme storer, heat storer, heat dispenser, and the like and be provided for this purpose as hollow fibers or other fibers. If hollow fibers are used for this purpose as warp threads, they can be sealed at their ends and the resultant encapsulated interior (lumen) can be filled with a suitable substance. With such a combination of different functions, the woven hollow fiber tape offers the advantage that it favors a uniformly repeatable local order.

The manufacture of the woven hollow fiber tape proceeds similarly to a shuttleless ribbon loom, as far as the weft insertion is concerned. It has been found especially advantageous in this regard when a device is used for this purpose that it is similar to that usually employed in needle ribbon looms. In this method, the shuttle is inserted very carefully so that no additional special monofilaments need to be provided to protect the hollow fibers along the side edges of the hollow fiber tape. It is also possible, however, to use a device like that usually employed in rapier looms.

In the method according to the invention for manufacturing woven hollow fiber tape, the drive for the transport of the warp threads (hollow fibers) and the drive for the device for inserting the weft threads are preferably decoupled or decouplable. This has the advantage that the weft thread density can be altered independently of the transport speed of the warp threads, or the weft insertion can be shut off completely even without interrupting the transport of the warp threads, which is highly advantageous when starting or changing the shuttle insertion device. Ordinary ribbon looms, such as needle ribbon looms, do not offer this advantage and are also not designed for a high weft density. The transport speed for the warp threads is so low that these machines are not suitable either for making hollow fiber tapes with much smaller weft densities or for integration into the manufacturing process for hollow fibers. Use of the known needle ribbon looms results in hollow fiber tapes with the usual high weft density and also allows only processing of hollow fiber bobbins. However, an advantage is also gained in that, with a suitable design of the knitted edge of the hollow fiber tapes, the weft threads can be pulled out again at a later point in time, since a double weft hollow fiber tape is also produced in this case.

One important advantage, however, is achieved in looms of this kind, especially when, as described above, the drive for the transport of the warp threads and the drive for the insertion of the shuttle can be decoupled or are decouplable. Hence, the merely optional coupling mentioned in the latter case of the two drives can also be performed mechanically or electrically.

When manufacturing the especially preferred embodiment of the hollow fiber tape with a low weft density, the otherwise normal reed can be eliminated, by which the weft threads are beaten onto the weft threads that have already been woven. This in turn results in a simplification of the manufacturing method and of the device suitable for the purpose.

Shedding can be performed in such a way that every second hollow fiber is raised as in a plain weave. When using more than two shedding devices and/or appropriately designing the shedding devices, other types of weave can be produced, for example, those with a float weave and the like, in which the shed is formed for example as in satin or body weave.

For simplified shedding, even in the method according to the invention, it is also possible to use ordinary heddles with healds. However it is much more advantageous to use for shedding, reeds that are open at the top (or bottom) with thread heddles of different depths. Reeds of this kind or similar devices can be provided with a device by which the thread heddles can subsequently be closed from above (or from below), for example, covered.

A rotating device or one that can be rotated backward and forward, similar to a camshaft, can also be used for shedding, in which the "cams" raise the hollow fibers to shed. When using shedding devices, the latter can be arranged to be moved like the heddles of ordinary looms; however, they can also be mounted on a common rotatable shaft so that shedding takes place in a manner similar to the device resembling a camshaft described above. It is also possible to guide more than one thread through one heald or one thread heddle (when using reeds).

Such shedding devices which are open at the top (or bottom) or similar devices for shedding can be inserted advantageously not only into a resting warp thread group from below (or from the top or from the side) but into one that is moving, considerably facilitating the initiation of the weaving process on resting warp threads and making it possible for the first time to work with moving warp threads.

The continuous hollow fiber manufacturing process is not interrupted as a result, and if the loom breaks down a spare unit can be inserted without interruption. Maintenance and replacement of weaving equipment is also possible without interrupting or influencing the manufacture of hollow fibers.

Figure 8:
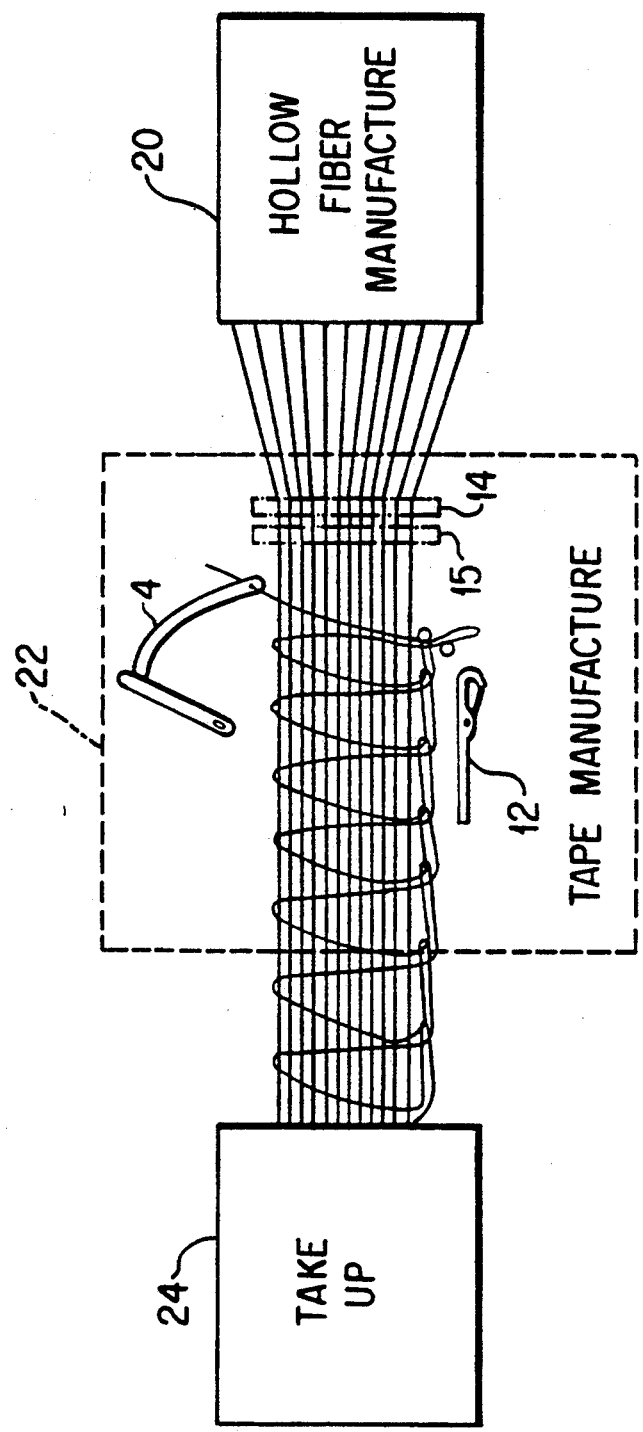
FIG. 8 shows an integrated manufacturing process.

The embodiment of the method for manufacturing a woven hollow fiber tape, in which the activity is performed without a reed and with decoupled or decouplable drives for the warp and weft threads, as described above and with shedding devices open at the top (or at the bottom) or similar devices for shedding, is therefore especially suited for being integrated into the manufacturing process for the hollow fibers 20 (as shown in FIG. 8). This ability, which did not exist in the previously known methods for manufacturing a woven hollow fiber tape, constitutes an important advantage and a significant technical advance which consists, for example, in reducing the method steps and hence the expense in manufacturing woven hollow fiber tapes, since it is no longer necessary as formerly to wind the hollow fibers initially onto bobbins and only later process them into woven hollow fiber tapes.

Thus, the method in its preferred embodiment can also be performed on hollow fibers which are still wet, damp, or generally unfinished, in other words, even before the extraction of solvents, before drying, or at another point in the manufacturing process This is possible because hollow fibers generally reach a basic strength immediately after coagulation or phase separation, which makes it possible to transport the hollow fibers through the weaving device according to the invention in which weft insertion takes place in a very careful manner. In this way, even at a very early stage in the manufacturing process, a fiber tape, namely a woven hollow fiber tape, can be manufactured which behaves much more favorably during the process and is much easier to handle. Thus, the tangles, sags, or rideovers (undesired threads crossing over one another), which are frequently observed, for example, on or between deflecting rollers, in thread sheets with hollow fibers running parallel to one another are avoided. It is also possible to improve the mutual spacing in the hollow fibers in this fashion, making it as small as possible initially, which can be utilized for a higher degree of implementation of existing facilities or results in much smaller (narrower) machines with the same production output, but still large enough for a good flow around the hollow fibers in method steps such as extraction, washing, drying, etc. A hollow fiber spacing in the range from 0.2 d to 1.5 d (d=hollow fiber outside diameter) has proven advantageous for most applications. In addition, the risk of threads breaking during the process is reduced and hence the processability of hollow fiber sheets is considerably improved.

The method according to the invention can also be integrated into the manufacturing process, with the hollow fibers being produced by melt spinning.

The shuttleless weaving method according to the invention allows (especially when the weft insertion is performed in a manner similar to that in a ribbon loom) high processing speeds for hollow fibers, i.e. hollow fiber sheets, into woven hollow fiber tapes according to the invention, with the processinq speed being limited by the technically feasible weft frequency. The ratio of the weft frequency to the warp thread speed produces the weft density, in other words, the distance between the individual weft threads. When the speed at which the hollow fibers are brought to and carried away from the weft insertion device decreases, while keeping the weft frequency constant, a resultant increase in weft density is produced and vice versa. Weft density should be kept as low as possible for cost reasons but so that the technical requirements are met in every case. Here again, an optimum can be determined by simple tests. The method according to the invention is consequently employed preferably at processing speeds of the hollow fibers in the range from 10 to 80 m/min with a weft insertion frequency in the range from 30 to 200 Hz.

The woven hollow fiber tape according to the invention can be processed 24, for example, into bobbins, hollow fiber bundles, or other hollow fiber arrangements.

Frequently, multifil bobbins are desired for manufacturing certain hollow fiber structures, in other words bobbins onto which a predetermined number of hollow fibers has been wound. This is frequently desirable when the number of hollow fibers in the finished structure (e.q. IV filter) is relatively low and so small a number of hollow fibers can be wound onto a bobbin. When a woven hollow fiber tape with a corresponding number of hollow fibers is used, it is no longer necessary to fit together a plurality of hollow fibers unwound from different bobbins to form multifil bobbins.

When unwinding the multifil bobbins previously in normal use, pinched threads or sags were frequently encountered, which led to discontinuities or broken threads. These problems can be avoided with multifil bobbins in which the hollow fibers are wound as woven hollow fiber tape. Frequently, however, the weft thread is undesirable in the finished product, and there may be many different reasons for this. The woven hollow fiber tape according to the invention also offers another important advantage, namely the possibility that the weft thread, with a corresponding tie (stitching), after unwinding the hollow fiber tape from the bobbin, can be pulled out immediately before further processing of the hollow fibers. This provision opens up a much broader range of applications for the woven hollow fiber tapes according to the invention, especially when the warp thread has only a temporary auxiliary function.

The woven hollow fiber tape according to the invention can also be wound into hollow fiber hanks, from which hollow fiber bundles of the desired length can then be cut. For this purpose a method or device can be used, for example like those described in U.S. Pat. No. 4,681,720.

The processing of the woven hollow fiber tape according to the invention into hollow fiber bundles, however, can be performed in a different way, whereby especially preferred manufacturing methods for hollow fiber bundles and the hollow fiber bundles manufactured by this method will be described below and explained in greater detail with the aid of the figures. The so-called packing density, in other words the ratio of the volume filled with hollow fibers to the total volume, can be set to the range from 30 to 60% in a device made from hollow fiber tapes according to the invention (dialyzer, oxygenator, heat exchanger, etc.).

FIG. 1 is a section through a woven hollow fiber tape, consisting of hollow fibers 1 as the warp threads and weft threads 2. The weft threads 2 in this embodiment of the woven hollow fiber tape run essentially parallel to one another and perpendicularly to the hollow fibers (warp fibers) 1, whereby the double wefts are clearly evident. The left-hand edge of the woven hollow fiber tape in the drawing is designed as a true selvage. The right-hand tape edge, on the other hand, is designed as a knitted edge, with the laterally projecting weft thread loops being knitted together (stitched) or, in other words, tied to themselves. A knitted edge of this kind can be tightened further if desired. The low weft density is also clearly apparent, which results from the fact that the adjacent weft threads 2 do not contact one another but are arranged at a distance from one another, which is a multiple of the thickness of the weft threads. According to the present invention, this arrangement can also be designed a meander-shaped pattern of weft threads.

Figure 2:
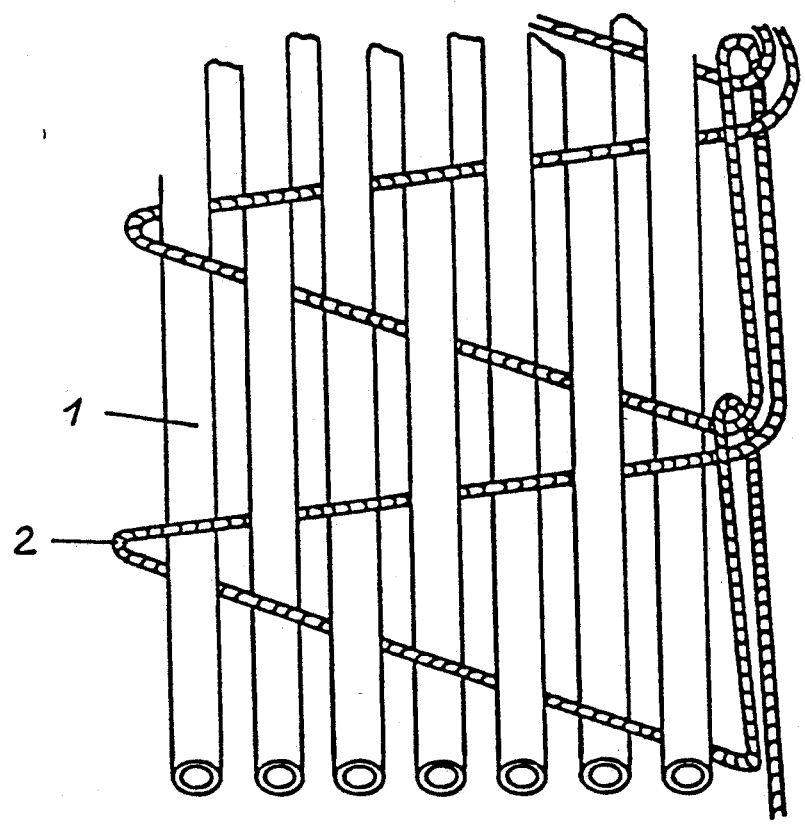
FIG. 2 shows a section of a second embodiment of a woven hollow fiber tape with an increased and angled spacing between widths.

FIG. 2 shows the section of a woven hollow fiber tape in which weft threads 2 form a zigzag line and hence an angle smaller than 90° with the hollow fibers (weft threads) 1. The weft density is even less than in the woven hollow fiber tape shown in FIG. 1. With regard to the other features of this embodiment of the woven hollow fiber tape, the reader is referred to the description of the embodiment of the woven hollow fiber tape shown in FIG. 1.

Figure 3:
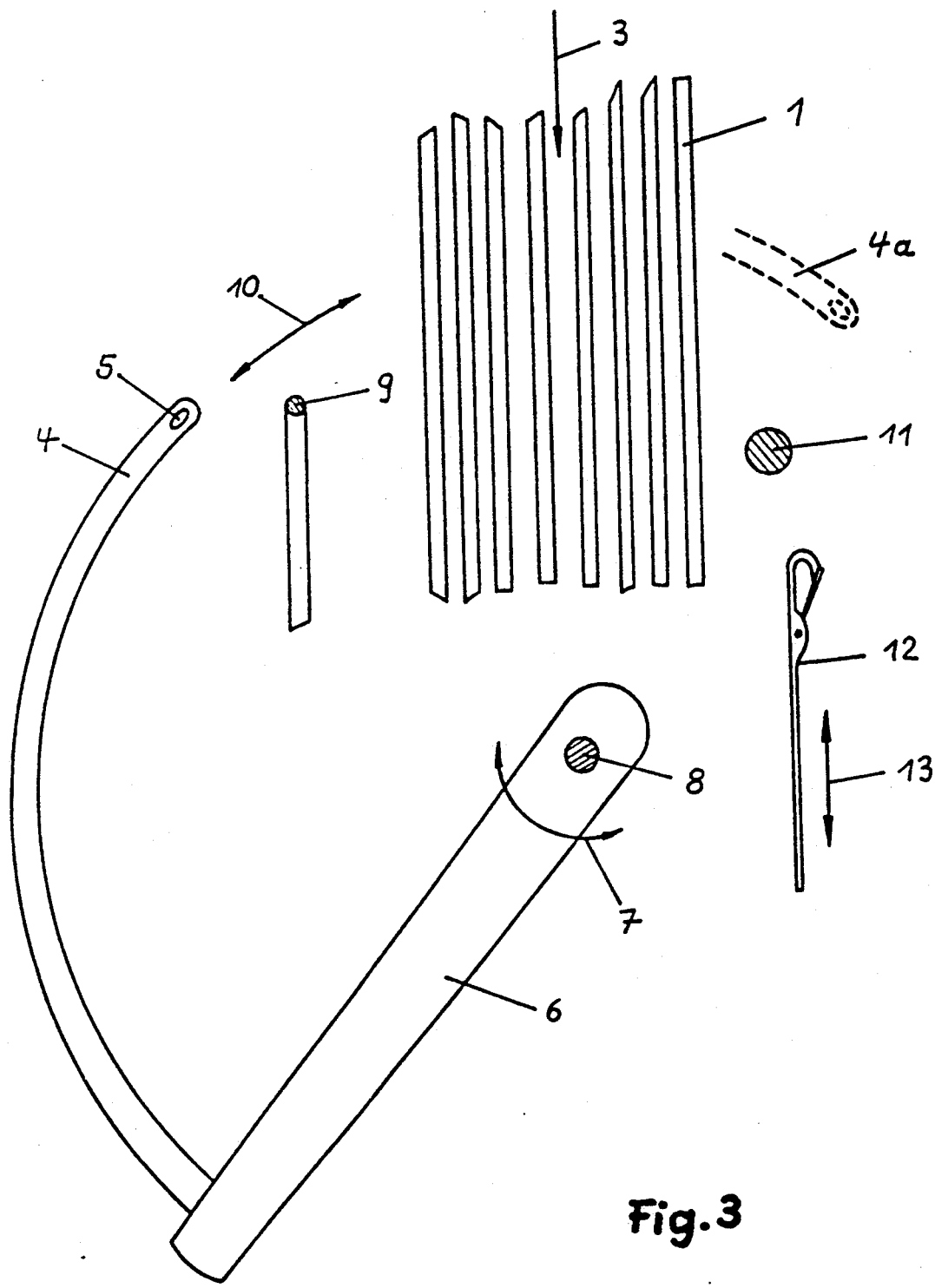
FIG. 3 is a view of a weft insertion device.

FIG. 3 shows a weft insertion device which resembles the type conventionally used in needle ribbon looms, and which is preferably used in the method and device for manufacturing the woven hollow fiber tape. Hollow fibers 1 run through the loom in the direction indicated by arrow 3. The device consists of the inserting element (needle) 4, with eye 5 for the weft thread (not shown), which is permanently attached to retaining arm 6. Retaining arm 6 is permanently attached to the shaft 8 which rotates back and forth, consequently executing a movement as indicated by arrow 7. The movement of retaining arm 6 causes needle 4 to perform a corresponding movement between two end positions as indicated by arrow 10. In the drawing, needle 4 is shown in its left-hand (in the plane of the drawing) end position. The right-hand (in the plane of the drawing) end position is located at the right above deflecting rod 11, as indicated by the tip 4a of needle 4 which is shown in dashed lines. Deflecting rod 11 is mounted perpendicular to the plane of the drawing and hence perpendicular to the plane in which the hollow fibers (warp fibers) 1 pass through the active area of the loom. Another part of the loom is retaining element 9 for the weft thread (not shown), which is mounted essentially perpendicular to the plane of the drawing, in other words perpendicular to the hollow fiber tape plane, and can be moved up and down. To stitch the weft thread loops on the right-hand hollow fiber tape edge at the right (in the plane of the drawing), the knitting needle (tongue needle) 12 is used which is mounted parallel to the lengthwise direction of the hollow fiber tape and can move back and forth, as indicated by arrow 13. The operation of the weft insertion device shown in FIG. 3 essentially corresponds to that known from needle ribbon looms, and therefore need not be described in greater detail here. The reed, as is usually found in needle ribbon looms, is missing from the device as shown, however.

Figure 4:
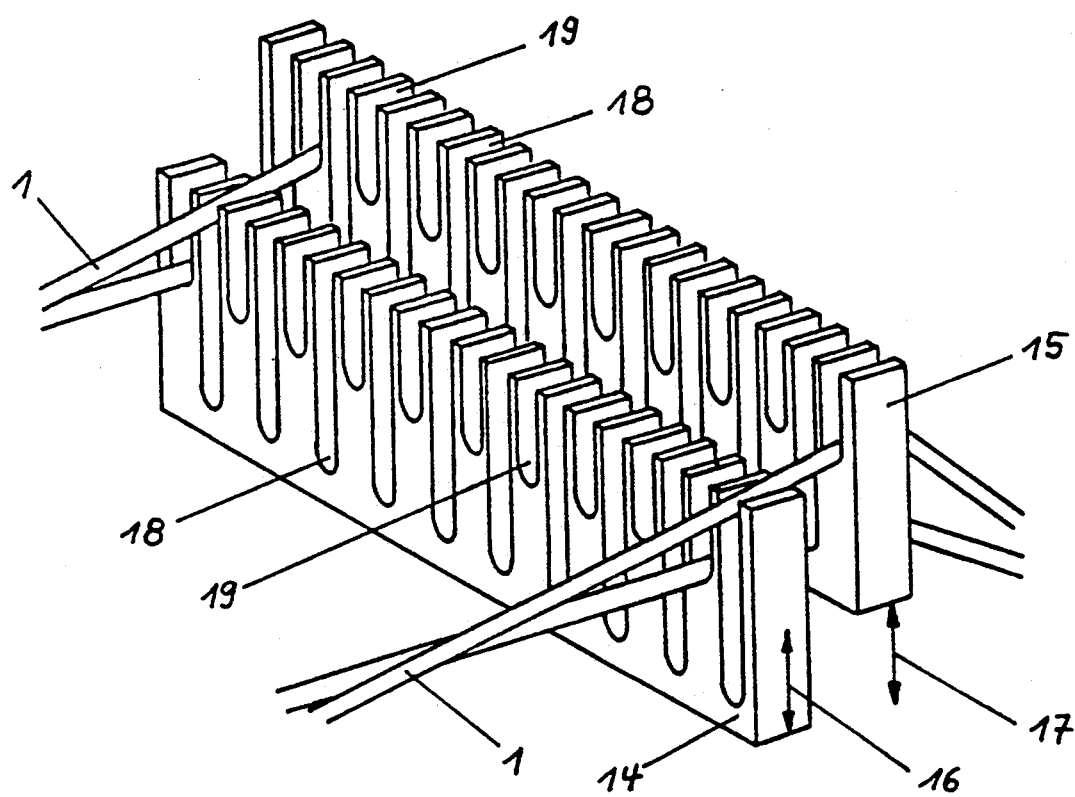
FIG. 4 is a perspective view of the device for shedding.

FIG. 4 shows two shedding devices 14 and 15 open at the top for shedding. Shedding devices 14 and 15 have thread heddles, or dents 18 and 19 of different depths, with thread heddle 18 being approximately twice as deep as heddle 19. Shedding devices 14 and 15 can be moved up and down, as indicated by arrows 16 and 17. Thread heddles 18 and 19 of shedding device 14 are mounted staggered opposite thread heddles 18 and 19 of reed shedding device 15, in other words looking in the direction of travel of the warp threads, a thread heddle 18 of shedding device 14 and a thread heddle 19 of shedding device 15 occur sequentially. The shed is shown only by the hollow fibers (warp fibers) drawn on both sides of shedding devices 14 and 15. In the embodiment of shedding device 14 and 15 shown here, each deep thread heddle is followed by a thread heddle 19 which is a little less deep, so that the shedding takes place in the same way as in plain weaving. However, it is also possible to provide a different arrangement of the thread heddles, for example such that two deep thread heddles 18 follow one or two less deep thread heddles 19, and so on. Thread heddles 18 and 19 of the shedding devices 14 and 15 shown, after insertion of hollow fibers 1, can also be covered to prevent hollow fibers 1 from jumping out during weaving. The open shedding devices 14 and 15 shown can, in the arrangement shown, be brought in and out advantageously from below, even with the warp thread sheet in motion, whereby the weaving process on a running warp thread sheet can be initiated or discontinued at any time, of course before or after a planned covering of thread heddles 18 and 19. With the reverse arrangement of shedding devices 14 and 15, the movement into and out of the warp thread sheet takes place from above.

Figure 5:
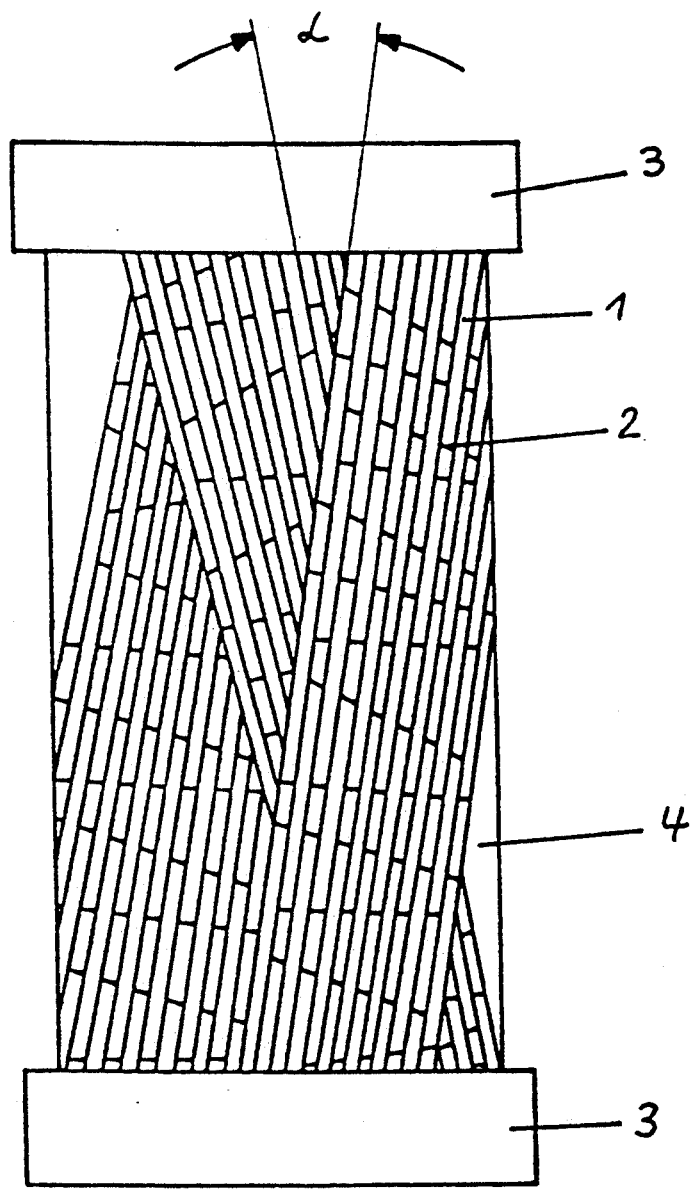
FIG. 5 is a hollow fiber bundle made of woven hollow fiber tapes.

FIG. 5 shows a hollow fiber sheet made of woven hollow fiber tapes in which the ends of hollow fibers 1 are embedded in head plates 3. Usually the hollow fiber ends are embedded by spinning them into a curable potting compound. After curing of the potting compound, as much material is removed endwise as is necessary to expose the open ends of hollow fibers 1, so that a throughflow in the chamber (lumen) of hollow fiber 1 is possible. This can be done at one end, for example, in so-called dead end filters, or at both ends, as for example in dialyzers, oxygenators, heat exchangers, etc. For legibility, only three hollow fiber tapes are shown, arranged in layers around a core 4 (e.g., a core tube) in such a way that hollow fibers 1 of adjacent layers form layers with an angle $\alpha$ which is preferably $\leq 30°$ and in special cases can also be only about 1°. The fact that weft threads 2 are present means that even at such small angles of intersection the overlap is maintained and the hollow fibers of one layer do not, as is unavoidable in hollow fiber tapes without weft threads, slip into the spaces of an adjacent layer, whereby a disorderly hollow fiber bundle would result, with hollow fibers essentially arranged parallel to one another and touching one another as well, which would result in an extremely inadequate surrounding flow distribution. The angle which hollow fibers 1 form with the lengthwise axis of the bundle (not shown) is about $\alpha/2$.

A hollow fiber bundle made of woven hollow fiber tapes can also be formed without a core. Thus, for example, two layers of woven hollow fiber tape can be formed, with the woven hollow fiber tapes being arranged parallel to one another inside a layer, but forming an angle $\alpha$ with the hollow fiber tapes of the other layer. The two layers can then be wound up in a spiral even without a core to form a hollow fiber bundle. It is understood, of course, that initially more than two layers can be formed when the hollow fibers of adjacent layers form an angle of intersection $\alpha$ and that this multilayer structure can then be wound up spirally, for example around a core, to form a hollow fiber bundle.

Figure 6:
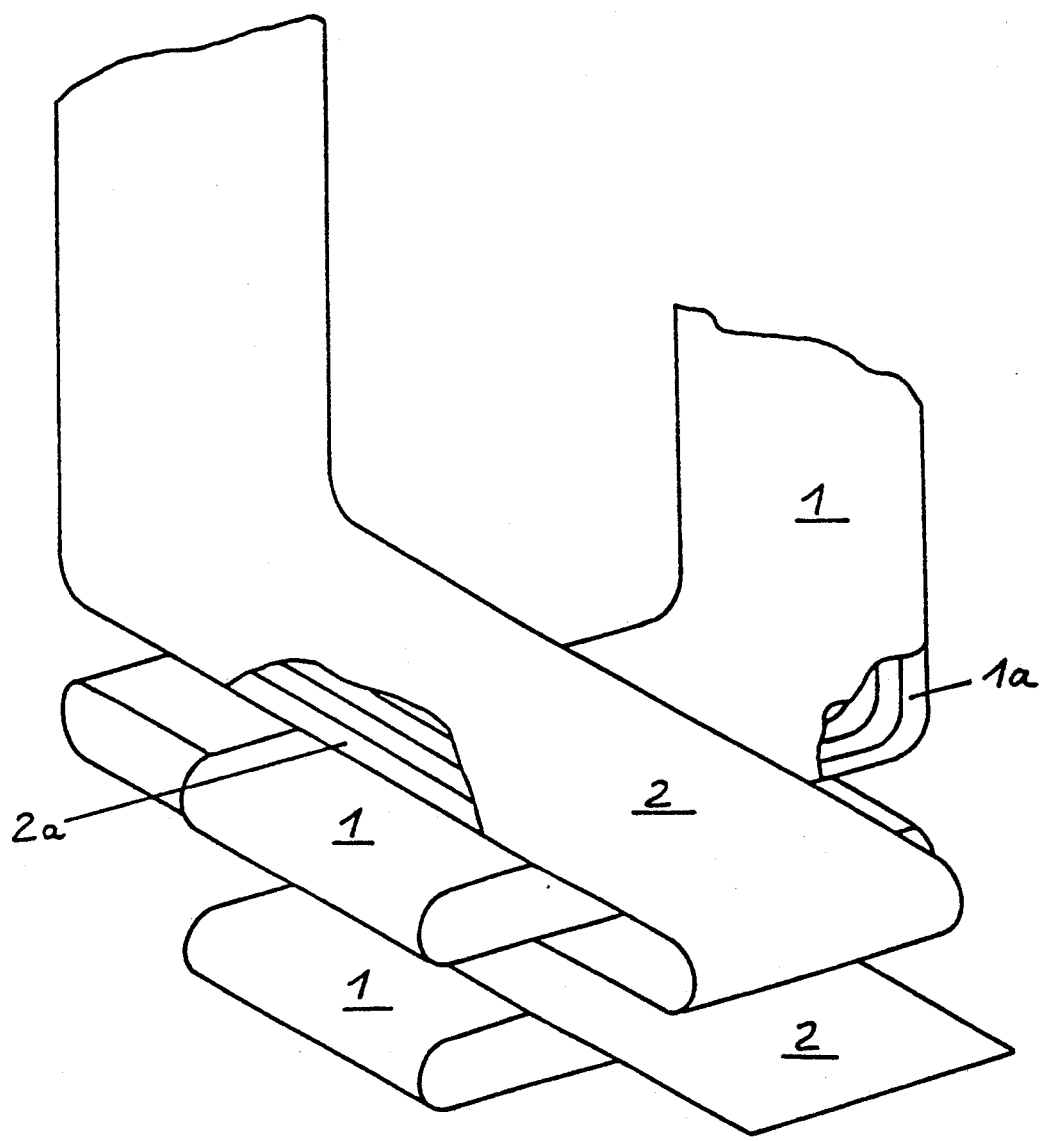
FIG. 6 is a hollow fiber structure made of woven hollow fiber tapes.

FIG. 6 shows in perspective view a hollow fiber structure of woven hollow fiber tapes 1, 2 formed by the simultaneous meanderwise laying down of two woven hollow fiber tapes 1 and 2, whereby the hollow fibers 1a and 2a extending in a lengthwise direction of such a woven hollow fiber tape intersect at right angles in the finished hollow fiber structure. This type of construction is termed plaiting for textile webs and the like. It can be done manually or by machine. Further processing of the hollow fiber structure to a hollow fiber module can be accomplished as follows: the deflecting points (bends) of the woven hollow fiber tapes 1 and 2 can be embedded along the four long sides of the hollow fiber structure in a suitably dimensioned potting compound plait and the hollow fiber spaces (lumina) are then exposed. A hollow fiber module of this kind makes it possible to enable three fluids to participate in a material and/or heat exchange, with the first fluid being guided through hollow fibers 1a, the second fluid through hollow fibers 2a, and the third fluid externally around hollow fibers 1a and 2a. It is also possible, however, to punch e.g. round segments out of the multilayered structure and process these further individually or in the punched-out multilayer structure, in other words the hollow fiber ends can be mixed into a curable potting compound.

Figure 7:
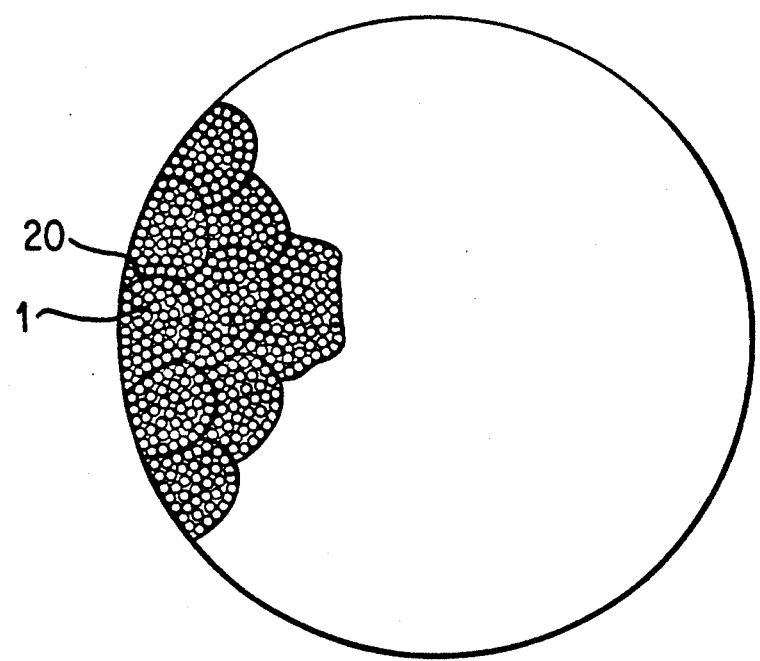
FIG. 7 portrays a cross-section of a hollow fiber bundle made of woven hollow fiber tapes.
Figure 9:
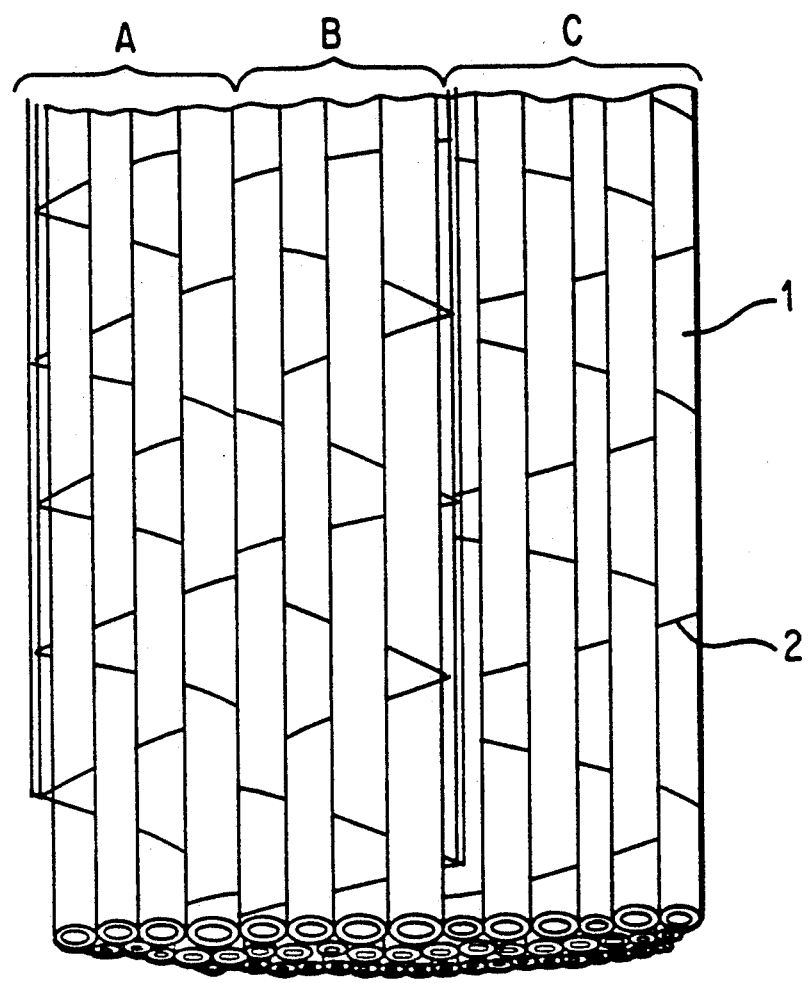
FIG. 9 shows a section of the hollow fiber bundle made of woven hollow fiber tapes that is shown in cross-section in FIG. 7.

FIG. 7 shows a portion of the cross section of a hollow fiber bundle made of woven hollow fiber tapes in which hollow fibers 1 are arranged essentially parallel to the lengthwise axis of the bundle, with the woven hollow fiber tapes being formed into partial bundles with any cross section, essentially irregular, in such a way that hollow fibers 1 are distributed essentially without gaps uniformly over the cross section of the hollow fiber bundle. The hollow fiber bundle (FIG. 9), therefore, consists of a plurality of woven, essentially parallel woven bundled hollow fiber tapes (indicated by A, B, C). In FIG. 7, the limit lines 20 shown of a shaped woven hollow fiber tape serve only for clarification; for example, there is only an imaginary and not a real limit between the individual partial bundles. Despite this arrangement, the presence of the weft threads 2 (FIG. 9) means that hollow fibers 1 will not slide into the spaces between adjacent hollow fibers 1, but that a relatively loose bundle of hollow fibers through which flow can occur smoothly is formed. In this arrangement of woven hollow fiber tapes as well, it is possible to provide a core (core tube) and to arrange the woven hollow fiber tapes essentially without gaps uniformly over the remaining annular cross section and to distribute them there.

What is claimed is:

1. A hollow fiber bundle having a lengthwise axis and comprising a plurality of woven hollow fiber tapes in which hollow fibers are in a form of warp threads of the woven hollow fiber tapes, the hollow fibers of each woven hollow fiber tape form an angle with the lengthwise axis of the bundle, the hollow fibers are arranged essentially parallel to one another inside each woven hollow fiber tape, and some part of the woven hollow fiber tape forms an angle of intersection with an adjacent woven hollow fiber tape, the woven hollow fiber tapes having a plurality of hollow fibers held together by a low density double weft thread weave, wherein the hollow fibers of each woven hollow fiber tape form an angle of $\leq 15°$ with the lengthwise axis of the bundle and the angle of intersection with adjacent woven hollow fiber tapes is $\leq 30°$.

2. A hollow fiber bundle, comprising a plurality of woven hollow fiber tapes in which the hollow fibers occur as warp fibers of the woven hollow fiber tapes, the woven hollow fiber tapes having a plurality of hollow fibers held together by a low density double weft thread weave, the hollow fibers in each of the hollow fiber tapes being arranged essentially parallel to a lengthwise axis of the bundle with each of the woven hollow fiber tapes having an essentially irregular, amorphous cross section, and the hollow fibers being arranged essentially without gaps uniformly over the hollow fiber bundle cross section, wherein the woven hollow fiber tapes form partial bundles to make up the hollow fiber bundle.

* * * * *

UNITED STATES PATENT AND TRADEMARK OFFICE
CERTIFICATE OF CORRECTION

PATENT NO. : 5,297,591
DATED : March 29, 1994
INVENTOR(S) : Ulrich BAURMEISTER

It is certified that error appears in the above-indentified patent and that said Letters Patent is hereby corrected as shown below:

Column 3, line 21, insert --the context of the present invention to be a woven tape in--.

Column 9, line 31, delete "reed".

Signed and Sealed this

Second Day of August, 1994

Attest:

BRUCE LEHMAN

Attesting Officer

Commissioner of Patents and Trademarks